O. D. NORTH.
SPRING FOR USE ON VEHICLES.
APPLICATION FILED OCT. 10, 1914.

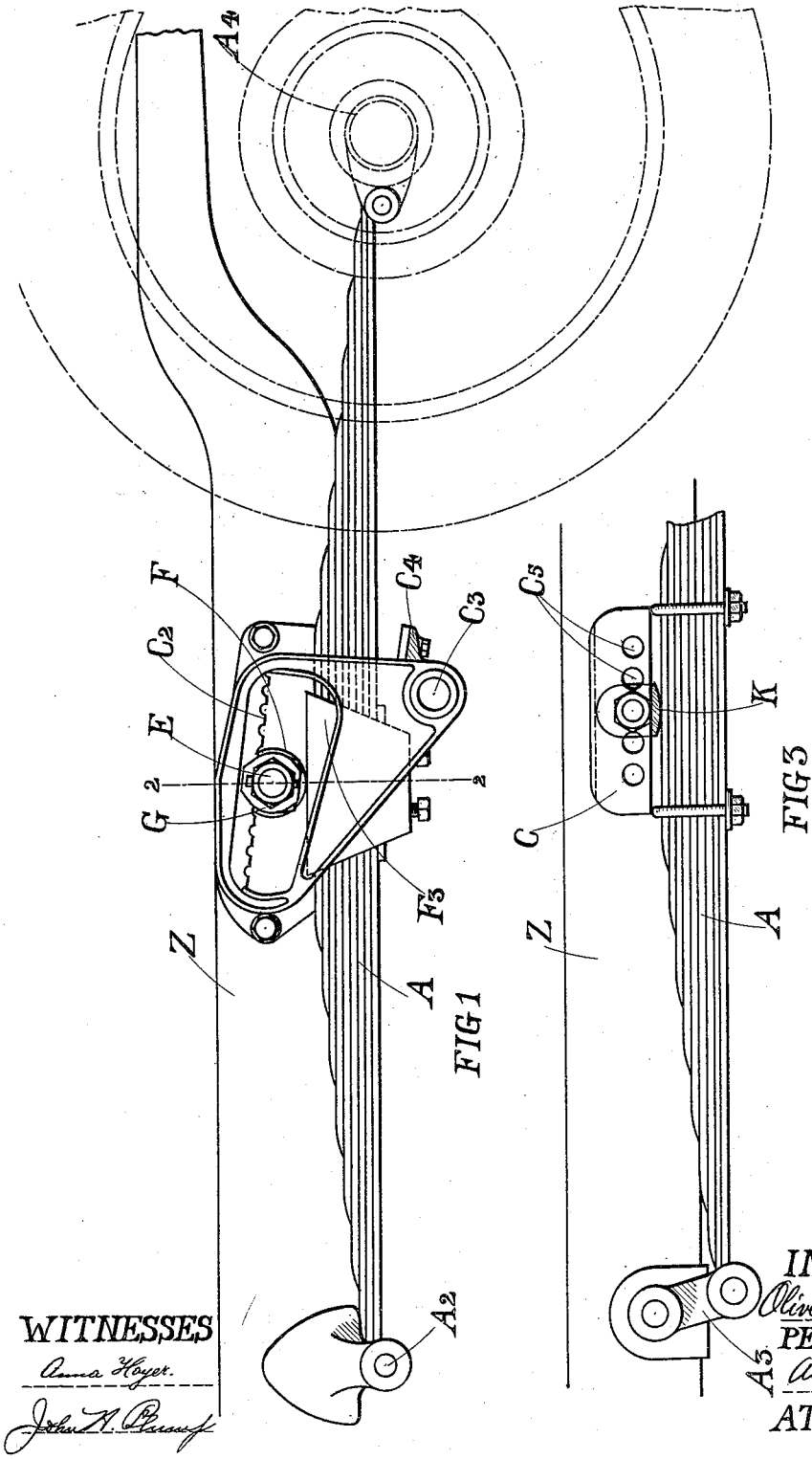

1,173,457. Patented Feb. 29, 1916.
2 SHEETS—SHEET 2.

WITNESSES

INVENTOR
Oliver Danson North
PER
ATTORNEY

UNITED STATES PATENT OFFICE.

OLIVER DANSON NORTH, OF CHELSEA, LONDON, ENGLAND.

SPRING FOR USE ON VEHICLES.

1,173,457.  Specification of Letters Patent.  Patented Feb. 29, 1916.

Application filed October 10, 1914. Serial No. 866,017.

*To all whom it may concern:*

Be it known that I, OLIVER DANSON NORTH, a subject of the King of Great Britain, and a resident of Chelsea, London, in the county of Middlesex, England, have invented certain new and useful Improvements in Springs for Use on Vehicles, of which the following is a specification.

My invention relates to cantaliver springs such as are used on motor vehicles, and it has for its object to provide simple means whereby the spring effect is adjustable to suit different loads or different conditions when the spring is on the vehicle.

The cantaliver spring to which my invention is particularly applicable is attached at one end to the axle and at the other end to the vehicle frame, while at some intermediate point it is pivoted to the frame.

According to my invention the central pivot or fulcrum is adjustable longitudinally with regard to the spring so that the "rate" or stiffness of the spring can be varied, either automatically, or otherwise.

Figure 5:
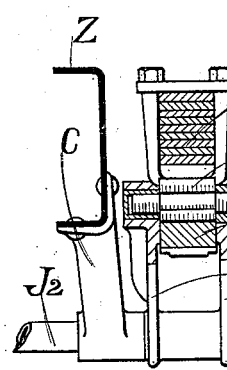
Figure 4:
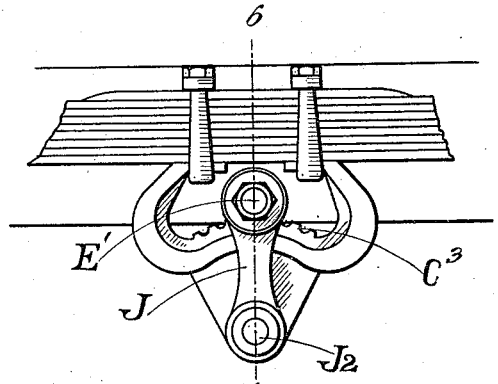
Figure 2:
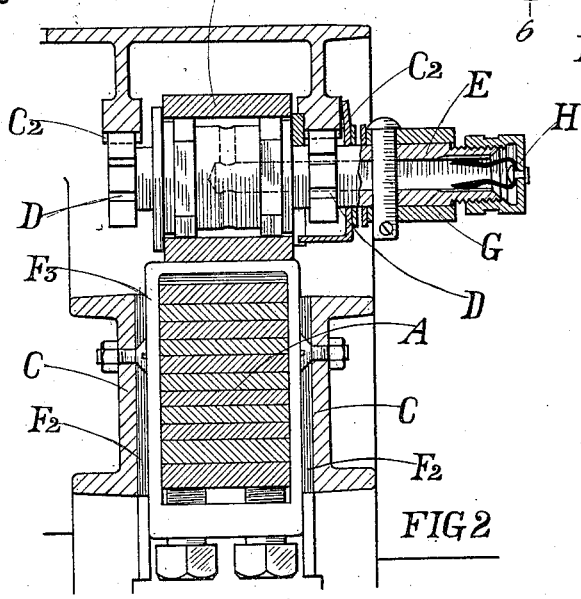

In the drawing, Figure 1 is a side elevation of the rear part of a motor vehicle showing one method of invention. Fig. 2 is a cross section on the line 2—2 of Fig. 1. Figs. 3 and 4 are side views partly in section showing modifications. Fig. 5 is a section on the line 6—6 of Fig. 4.

Like letters indicate like parts throughout the drawings.

In spring suspension of this kind the spring A is sometimes attached directly to the frame Z at the point $A^2$, as shown in Fig. 1, but it is more usually attached to a shackle $A^3$ pivoted to the frame Z as shown in Fig. 3. In either case the rear end of the spring is attached to the axle $A^4$ and the load on the frame Z bears downward on the spring at or near its center. Usually the spring is pivoted to a bracket on the frame at this point and the point of this pivot is a fixture on the vehicle. It is however, not actually necessary that the spring be pivoted to the frame as the load is always in the same direction. It suffices in many cases that the frame rest upon the spring at a certain point, which may be termed the fulcrum of the spring.

In the construction shown in Figs. 1 and 2 there is carried by the frame Z a bracket consisting of a pair of open sided triangular plates C which lie one on each side of the spring A. Each of these plates is formed with rack teeth $C^2$ engaging pinions D on a short pin E. The pinions are of the well-known knuckle type, *i. e.* their teeth are rounded to correspond to the shape of the teeth $C^2$ shown in Fig. 1. The reason for employing teeth of this kind will be explained later. The pin E, (hereinafter termed the fulcrum pin), also carries a roller F which bears upon the top of the spring A or upon a clip $F^3$ which surrounds the spring and is adapted to slide against suitable bearing surfaces $F^2$ formed of fiber or like material carried by the plates C. The latter are connected together beneath the spring by a bolt passing through the aperture $C^3$ and a stop $C^4$ is arranged on the plates C. It will be clear that the frame normally rests upon the springs through the medium of the rollers F at each side of the vehicle, but obviously if the frame were lifted considerably, as might happen on a very rough road, the spring might pass out of the space between the plates C, which is prevented by the stop $C^4$. It will be understood that if the fulcrum pin E is adjusted along the rack $C^2$ the position of the fulcrum of the spring is altered and thereby the "rate" or stiffness of the spring is varied. It is merely necessary therefore to rotate the pin E to effect said adjustment. This by the engagement of the pinions D with the racks $C^2$ causes the pin to move bodily along the rack, the roller F revolving on the top of the spring. By employing pinions having knuckle teeth the pin vibrates vertically as it moves in relation to the rack, the distance between the plane of the rack and the axis of the shaft varying as each tooth is passed. Under load the pinion automatically tends to rest in a position in which two teeth are in engagement with the rack. For the pinion to move the frame must rise slightly against the weight on the frame. In this way the tendency for the pinion to revolve of its own accord is obviated.

The pin E has fixed to it a nut, or other suitable surface G, which enables it to be rotated, and if desired a grease cup H may be employed to lubricate the bearing parts. In this construction it will be clear that it is merely necessary to fix a spanner on to the nut G and to rotate this, thereby rolling the fulcrum pin along the spring.

In the alternative construction shown in Figs. 4 and 5, a curved rack $C^3$ is attached to the spring by the clips shown, and a knuckle toothed pinion D' on the pin E' bears on the rack. The pin E' is carried in bearings in the swinging links J which can turn on a pin $J^2$ carried by the bracket C attached to the frame Z of the vehicle. By rotating the pin E' the pinion moves along the rack and the position of the fulcrum of the spring is thereby changed, as will be clearly understood.

In the case shown in Fig. 3 the frame Z carries a block K which merely rests upon the top of the spring A and this block is adjustable in relation to the frame. For instance it may be bolted or otherwise attached to a bracket C having holes $C^5$. In this case it will be merely necessary to take the weight off the spring by lifting the vehicle frame when the position of the block K can be altered. A convenient method of effecting this would be to insert a lever under the frame, resting it upon the top of the spring A, using the spring as a fulcrum.

In the devices illustrated in Figs. 1, 2, 3 and 4 it is necessary to adjust each spring separately, and this may in some cases be advantageous as it enables compensation to be made for unequal distribution of the load on the vehicle.

I am making no claim to the adjustment of the resiliency of laminated springs other than of the cantaliver type as it has already been proposed to arrange springs of other types with automatic or other adjustments. These have been variable after the springs have been fitted to the vehicle.

What I claim as my invention, and desire to secure by Letters Patent, is:—

1. The combination of a vehicle frame, an axle, a cantaliver spring having its one end attached to the said frame and its other end to said axle, a fulcrum pin for said spring intermediate its ends, a curved part carried by said spring, a movable part mounted on said fulcrum pin and adapted to move on said curved part, and a swinging link pivoted to said frame and carrying said fulcrum pin.

2. The combination of a vehicle frame, an axle, a cantaliver spring having its one end attached to said frame and its other end to said axle, a fulcrum pin for said spring intermediate its ends, a curved rack carried by said spring, a rotatable toothed wheel on said fulcrum pin bearing on said rack, and swinging links pivoted to said frame and carrying said fulcrum pin.

3. The combination of a vehicle frame, an axle, a cantaliver spring having its one end attached to said frame and its other end to said axle, a fulcrum pin for said spring intermediate its ends, a curved rack carried by said spring, a rotatable toothed wheel on said fulcrum pin bearing on said rack, a bracket attached to said frame, a pin mounted in said bracket and swinging links carrying said fulcrum pin and adapted to turn about said pin.

In testimony whereof I have signed my name to this specification in the presence of two subscribing witnesses.

OLIVER DANSON NORTH.

Witnesses:
 ERNEST HARPER,
 KATHLEEN M. THOMPSON.

Copies of this patent may be obtained for five cents each, by addressing the "Commissioner of Patents, Washington, D. C."